A. SHUMAN.
GLASS ROOFING OR WALL.
APPLICATION FILED NOV. 25, 1918.

1,387,621.                                    Patented Aug. 16, 1921.
3 SHEETS—SHEET 1.

WITNESS:

INVENTOR
Arno Shuman
BY
ATTORNEY.

A. SHUMAN.
GLASS ROOFING OR WALL.
APPLICATION FILED NOV. 25, 1918.

1,387,621.

Patented Aug. 16, 1921.
3 SHEETS—SHEET 2.

WITNESS:
Rob't A. Kitchel.

INVENTOR
Arno Shuman
BY
Augustus B. Stoughton.
ATTORNEY

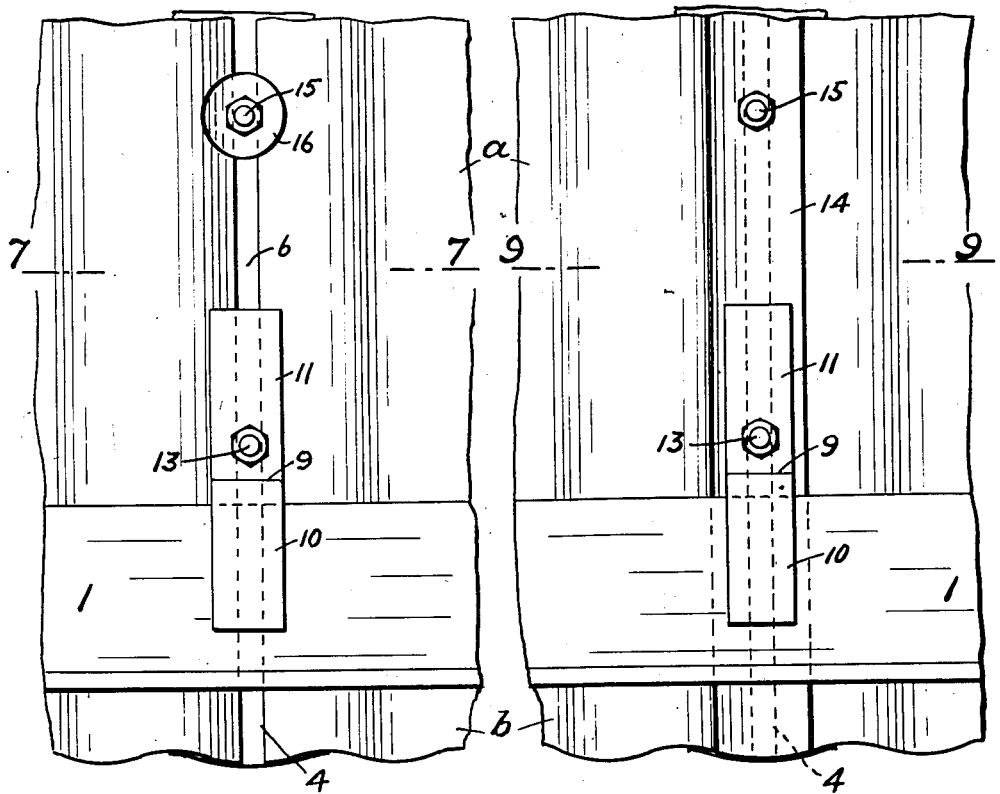

UNITED STATES PATENT OFFICE.

ARNO SHUMAN, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY.

GLASS ROOFING OR WALL.

1,387,621.      Specification of Letters Patent.     Patented Aug. 16, 1921.

Application filed November 25, 1918. Serial No. 263,983.

*To all whom it may concern:*

Be it known that I, ARNO SHUMAN, a citizen of the United States, and a resident of Philadelphia, in the county of Philadelphia and State of Pennsylvania, have invented certain new and useful Improvements in Glass Roofing or Walls, of which the following is a specification.

Roofs and walls are frequently constructed of sheets of glass and sheets of other material, for example of corrugated wire glass and corrugated asbestos, and there is no difficulty in securing the asbestos, or other sheets which can be readily punched, to the purlins, and single sheets of glass can be readily held in place by underlapping them with the sheets of other material, but where sheets of glass arranged end to end are required, there is difficulty in securing them to the purlins in proper association with the sheets of other material, for the glass sheets cannot be punched or conveniently provided with holes for the passage of fastening devices.

The principal object of the present invention is to provide for securing sheets of glass, whether of the corrugate, wire or flat variety, in end to end and lapping relation to purlins while providing tight joints; another object of the invention is to do this while at the same time retaining the proper relation of the glass and sheets of other material, and avoiding excessive laps and thus economizing in the use of material; and another object of the invention is to provide a strong, tight, sightly and comparatively inexpensive construction in which glass may largely enter.

Other objects of the invention will appear from the following description, and the invention will be claimed at the end hereof, but will be first described in connection with the embodiments of it chosen for illustration in the accompanying drawings forming part hereof and in which—

Figure 1:
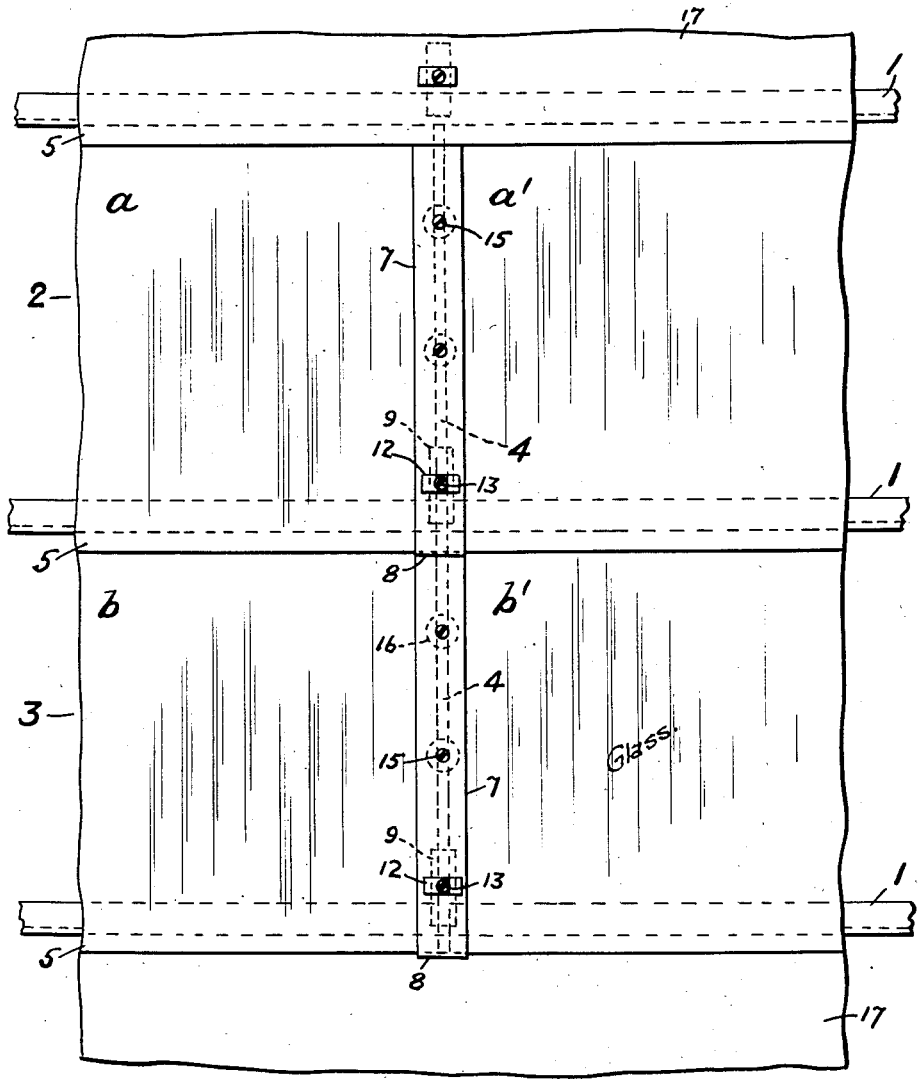
Figure 1, is a top or plan view showing glass parts of a roof or wall embodying features of the invention.
Figure 2:
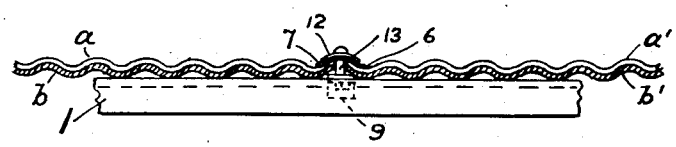
Fig. 2, is a transverse sectional view.
Figure 3:
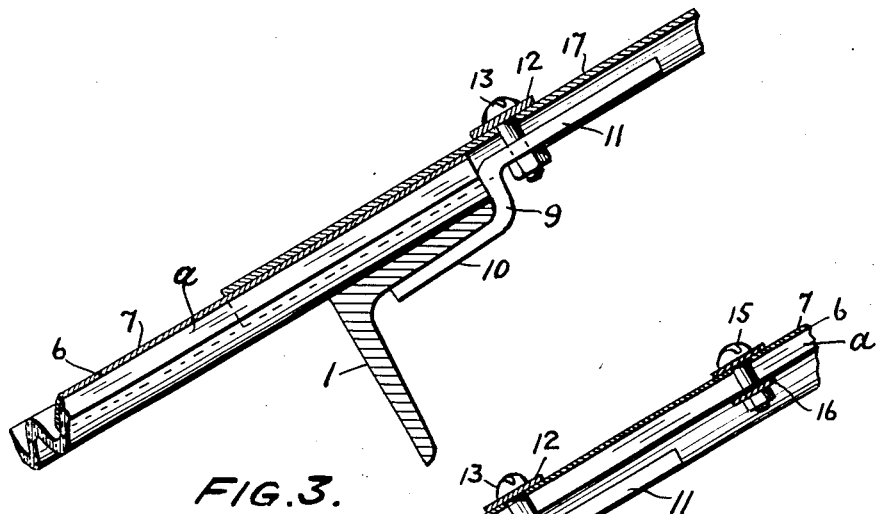
Figure 4:
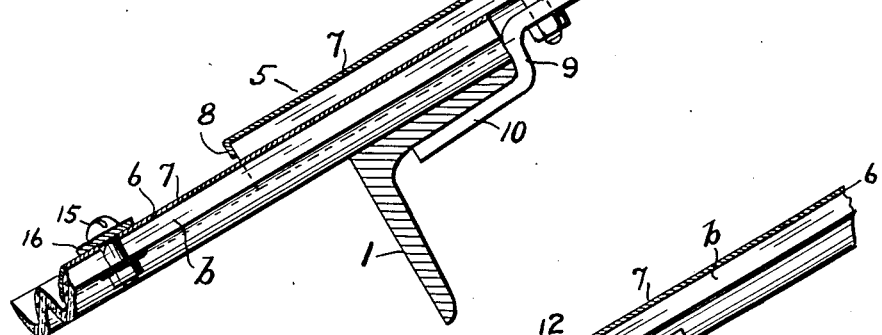
Figure 5:
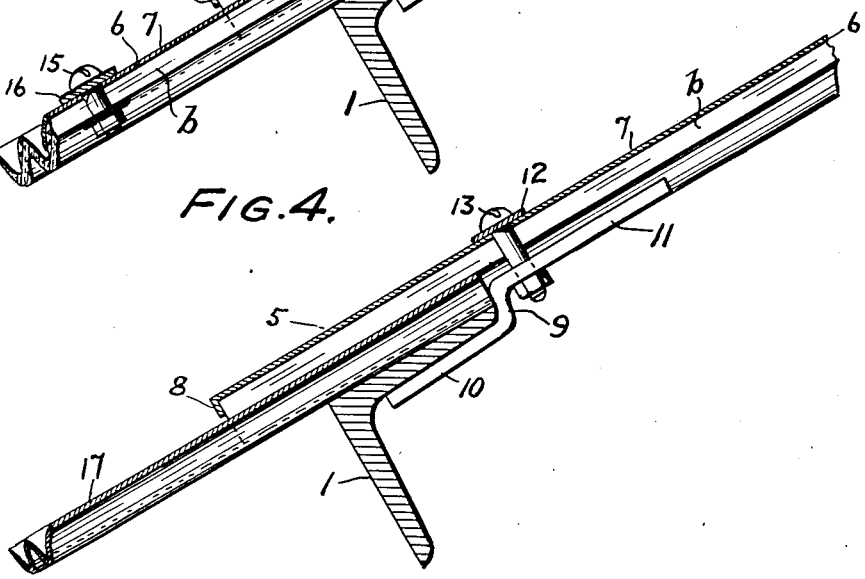

Figs. 3, 4, and 5, are vertical sectional views drawn to an enlarged scale and illustrating features of the invention.

Fig. 6, is an elevational view of a part of the inside of a glass roof or wall embodying features of the invention.

Fig. 7, is a sectional view, on the line 7—7 of Fig. 6.

Fig. 8, is a view similar to Fig. 6, illustrating a modification.

Fig. 9, is a sectional view on the line 9—9 of Fig. 8, and

Fig. 10, is a sectional view illustrating flat or plain instead of corrugated glass.

In the drawings 1 are purlins or horizontal supports that may be considered parts of a slant roof or vertical wall. 2 and 3, are rows of glass sheets $a$—$a^1$ and $b$—$b^1$ arranged edge to edge, with space 4 between and horizontally lapped as at 5 over the purlins. The space 4 is covered by a strip 6 of rubberoid or equivalent roofing of the same length as the sheet of glass, and tar or equivalent paint may be applied between the glass and the roofing strip 6. 7, are batten strips, as of appropriate metal, and they cover the space 4 and are lapped over the purlins 1. These batten strips are shown as turned in at 8 to provide a hook-flange for engaging the end of the sheet of glass. 9, is a clip resting on the top edge of the purlin 1 and having a heel 10 engaging the underface thereof, and a toe 11 underlying the lap and sheet of glass. 12, is a saddle on the batten strip and it is of appropriate metal. 13, is a bolt connecting the toe and saddle and arranged through the space 4 and passing through the batten strip 7.

In the construction thus far described when viewed from the inside, the roofing strip 6 is visible and since it is usually dark in color it might be considered by some people and in some places unsightly. To meet these conditions an interior metal strip 14 may be applied inside of the glass and between it and the clips 9. Between the purlins, bolts 15 having washers 16 may be arranged in a casual manner so as to extend through the space 4 and engage the batten strip and the interior surface of the glass or of the interior strip 14, when the latter is present.

In Figs. 1 to 9, the glass is shown as corrugated and it may be of the wire glass variety. Corrugated wire glass is frequently combined with corrugated asbestos board or building material, which is indicated at 17 in Figs. 1 and 5, and when that is the case, the asbestos and glass may overlap as shown. Flat glass, either plain or wire, as indicated at $a^2$ in Fig. 10 can be used in connection with the invention in substantially the manner described, but in the case of flat glass the batten strip 12$^a$ may be initially grooved or arched in cross-section so that when bolted down it tends to exert pressure on the glass, although a flat batten strip may be employed if desired.

From the foregoing description it is evident that two or more rows of sheets of glass arranged end to end may be employed and mounted so as to form a tight roof or wall, while at the same time an economy is effected in the use of glass because overlaps are reduced to a minimum.

Evidently the structure can be rapidly and easily assembled and is comparatively inexpensive in that regard, as well as in regard to the fittings that are required. The structure is particularly applicable to glass for the reasons stated and additionally because it is not necessary to make holes in the sheets.

In use the lapped sheets of glass are held firmly down to the purlins and the hook-flange 8, when present, opposes endwise shifting of the sheets because it connects the ends of the sheets through the bolts 13 with the clips 9 and purlins 1. The toes 11 of the clips are shown as contacting with the inner faces of the sheets, but if desired a pad can be inserted and this will be understood without illustration which would only tend to confuse the figures.

Reference has been made to sheets of glass on account of the difficulty, amounting practically to impossibility, of making holes or openings in them, but I claim as equivalents sheets of other material devoid of holes or openings especially when arranged in a construction in which the space between their edge is covered by a batten strip secured to the purlin member by a fastening device that passes through the batten strip and is attached to the purlin member and arranged in the space.

What I claim is:

1. In glass roofing or walls the combination of rows of glass sheets laterally unsupported and arranged edge to edge with space between and horizontally lapped at their ends, the bottom sheet constituting the sole support for the top sheet, a horizontal purlin underlying the lapped portions and directly supporting the sheets at their lapped ends, batten strips covering said space and lapped over the purlin, a clip resting on the top edge of the purlin and having a heel engaging the underface thereof and a toe underlying the lap, a saddle on the batten strip, and a single bolt disconnected from the purlin and connecting the toe and the saddle and arranged through the space and passing through the batten strip, substantially as described.

2. In glass roofing or walls the combination of rows of glass sheets laterally unsupported and arranged edge to edge with space between and horizontally lapped, the bottom sheet constituting the sole support for the top sheet, a horizontal purlin underlying the top sheet, a horizontal purlin underlying the lapped portions and supporting the sheets at their ends and constituting the sole support therefor, batten strips covering said space and lapped over the purlin, a clip engaging the purlin, and a bolt free from the purlin and connecting the clip and batten strip and arranged through said space, substantially as described.

3. In glass roofing or walls the combination of a purlin, rows of glass sheets laterally unsupported and arranged edge to edge with space between and horizontally lapped over and supported at their ends directly by the purlin, batten strips covering said spaces and lapped over the purlin, a clip engaging the purlin and arranged inside of said sheets, a saddle on the batten strip, and a bolt unconnected with the purlin and connecting the saddle and clip and passing through said space, substantially as described.

4. In a glass roofing or wall the combination of a purlin, rows of glass sheets laterally unsupported and arranged edge to edge with space between and horizontally lapped over and supported at their ends only by the purlin, batten strips covering said space and lapped over the purlin, roofing strips between the batten and glass, a clip engaging the purlin and arranged inside the glass, a saddle on the batten strip, and a single bolt arranged in said space and connecting the strip and saddle and passing through the batten strip, substantially as described.

5. In glass roofing or walls the combination of a purlin, rows of glass sheets laterally unsupported and arranged edge to edge with space between and horizontally lapped over and supported at their ends directly by the purlin, batten strips covering said space and lapped over the purlin, interior strips covering said space, a clip engaging the batten and resting on the interior strip, a saddle on the batten strip, and a bolt connecting the saddle and clip and arranged through said space, substantially as described.

6. In glass roofing or walls the combination of a purlin, rows of glass sheets laterally unsupported and arranged edge to edge with space between and horizontally lapped over and supported at their ends directly by the purlin, batten strips covering said space and lapped over the purlin and provided with hook flanges for engaging the ends of the glass, a clip engaging the purlin, and means for fastening the clip and batten strip and arranged through said space, substantially as described.

ARNO SHUMAN.